United States Patent
Bolton et al.

(10) Patent No.: US 6,913,671 B2
(45) Date of Patent: Jul. 5, 2005

(54) COMPACT EVAPORATION APPARATUS

(76) Inventors: Danny R. Bolton, 13501 CR 105, Brownwood, TX (US) 76801; James E. Bigham, 5600 FM 3100, Blanket, TX (US) 76432

(*) Notice: Subject to any disclaimer, the term of this patent is extended or adjusted under 35 U.S.C. 154(b) by 0 days.

(21) Appl. No.: 10/249,858

(22) Filed: May 13, 2003

(65) Prior Publication Data

US 2004/0045681 A1 Mar. 11, 2004

Related U.S. Application Data

(60) Provisional application No. 60/408,930, filed on Sep. 6, 2002.

(51) Int. Cl.[7] ............................................. B01D 1/14
(52) U.S. Cl. ..................... 159/16.2; 159/29; 159/44; 159/DIG. 2
(58) Field of Search ........................... 159/16.2, DIG. 2, 159/29, 44, 28.6, 38–40, 16.1, 47.3; 126/360.1–360.2; 202/181, 197, 267.1

(56) References Cited

U.S. PATENT DOCUMENTS

| | | | | |
|---|---|---|---|---|
| 2,005,422 A | * | 6/1935 | Hunicke et al. | 159/47.3 |
| 3,138,150 A | * | 6/1964 | Hyer et al. | 126/360.2 |
| 3,276,510 A | * | 10/1966 | Austin et al. | 159/16.2 |
| 3,322,181 A | * | 5/1967 | Williams | 159/4.02 |
| 3,407,862 A | * | 10/1968 | Mustian, Jr. | 159/16.2 |
| 3,840,002 A | * | 10/1974 | Douglas et al. | 126/360.2 |
| 4,128,453 A | * | 12/1978 | Angerer et al. | 159/16.3 |
| 4,278,494 A | * | 7/1981 | Lilja et al. | 159/16.2 |
| 4,838,184 A | | 6/1989 | Young et al. | |
| 5,342,482 A | | 8/1994 | Duesel, Jr. | |

* cited by examiner

*Primary Examiner*—Virginia Manoharan
(74) *Attorney, Agent, or Firm*—Daniel V. Thompson

(57) ABSTRACT

A compact evaporation apparatus includes an evaporator vessel with a sloped, bottom chamber. A combustion chamber is mounted to a top of the vessel, with a burner mounted to a top of the combustion chamber, the combustion chamber sized to achieve total combustion of an air/gas mixture supplied to the burner before being released below a liquid surface in the vessel. At least one turbulence diverter plate is located within the vessel beneath the liquid surface, the diverter plate being a submerged perforated plate extending horizontally from the combustion chamber, such that hot combustion gasses are released below the diverter plate, and as large gas bubbles rise to the surface they pass through small perforations in the diverter plate, thereby breaking large, hot gas bubbles into small bubbles, the gas to liquid contact area being maximized to increase system efficiency.

6 Claims, 5 Drawing Sheets

COMPACT EVAPORATION APPARATUS

BACKGROUND OF INVENTION

1. Field of the Invention

This invention relates to evaporators, and more particularly, to an evaporator for the treatment of contaminated wastewater.

2. Background Art

The disposal of contaminated wastewaters is of increasing concern due to ever tighter environmental regulations. Sources of such wastewaters are municipal landfills, petrochemical industries, paper industries, food industries, agricultural operations, remedial clean-up activities, and general industrial sources.

In particular, various kinds of wastes are buried in landfills that are known to produce noxious gases and condensates as the wastes decompose. In addition, water from rain and other sources percolates through the buried wastes, creating noxious leachates. These leachates are composed of a variety of chemicals, many of which are hazardous Escaping gases and liquids from such landfills are recognized as sources of pollutants that present health and environmental hazards and must be collected and treated.

It is common to dispose of the noxious gases produced by a landfill by withdrawing these largely methane gases and burning them in flares or other types of gas combustion devices. In most cases removal of the noxious gases from the landfill results in the production of liquid condensates. These condensate liquids together with the leachate liquids have traditionally been collected and hauled from the landfill site for disposal. This process of disposal is itself regulated and expensive as evidenced by the large amount of attention that has been given to the transportation and safe disposal of industrial waste liquids.

Prior art technology has been developed to deal with leachate and condensate disposal and includes the evaporation of the liquid leachate/condensate in a gasdirect contact evaporator, such as that taught in the patent to Young et al., U.S. Pat. No. 4,838,184. The Young patent teaches an apparatus and method for combusting a portion of the landfill gases and contacting a stream of the hot combustion products with the leachate liquids from the landfill to vaporize a portion of the leachate liquids. A drawback of the Young apparatus is its complexity and inefficiency, and the apparatus does not produce the desirable end result pollutant-free water vapor and an easily disposed of concentrated solids sludge.

Similarly, the patent to Duesel, U.S. Pat. No. 5,342,482 discloses an evaporation device for landfill leachate that has two zones, an evaporation zone in the upper section of the apparatus and a quiescent solids-settling zone in the lower section of the apparatus. This enables the simultaneous carrying out of evaporation and solids settling. It has been found, however, that the percentage of solids in typical wastewater streams is actually quite low, such that only after long periods of evaporation is it necessary to remove solids. In this situation it is preferable to merely pause the evaporation process for an appreciable period of time to permit solids to settle and then be removed. This non-simultaneous batch approach to evaporation and solids settling avoids the overly complex dual-zone apparatus of the Duesel patent.

Thermal efficiency has been found to be a key factor in the design of successful evaporator systems. Where landfill gas is the fuel, the fuel is essentially of no cost. The low-BTU nature of the gas, however, requires that as much as possible of what little energy is available be utilized for evaporation. Where purchased natural gas or propane gas is used as the fuel, expense becomes of primary concern and thermal efficiency is again a key factor. It would be therefore be desirable to have a disposal system that would overcome these and other limitations of the prior art systems. That is, it is desirable to have a disposal system which can efficiently and lawfully dispose of all leachate and gas condensates produced from any landfill in an apparatus, and which produces an easily disposed of solids sludge, while releasing only substantially pollutant-free water vapor which can be readily discharged in compliance with air quality standards and regulatory permits governing landfills.

SUMMARY OF INVENTION

The present invention provides a compact evaporation apparatus having a series of vertically-stacked turbulence diverter plates within an evaporator vessel to optimize thermal efficiency. An influent level signal system is located outside the vessel to enable liquid level sensing remote from the turbulence inside the vessel. The compact evaporation apparatus of the present invention is designed to efficiently evaporate primarily wastewaters generated from any industrial, commercial or municipal source.

The present invention utilizes submerged combustion technology. This is a highly-efficient, proven process where the combustion of the air and gas occurs below the surface of the liquid being evaporated. The hot air stream is also released below surface and into direct contact with the liquid being evaporated.

The bottom of the tank is sloped to allow any solids that may be contained in the waste water to settle into a trough when the unit is not evaporating.

BRIEF DESCRIPTION OF DRAWINGS

A more complete understanding of the invention and its advantages will be apparent from a review of the Detailed Description in conjunction with the following Drawings, in which.

DETAILED DESCRIPTION

Figure 1:
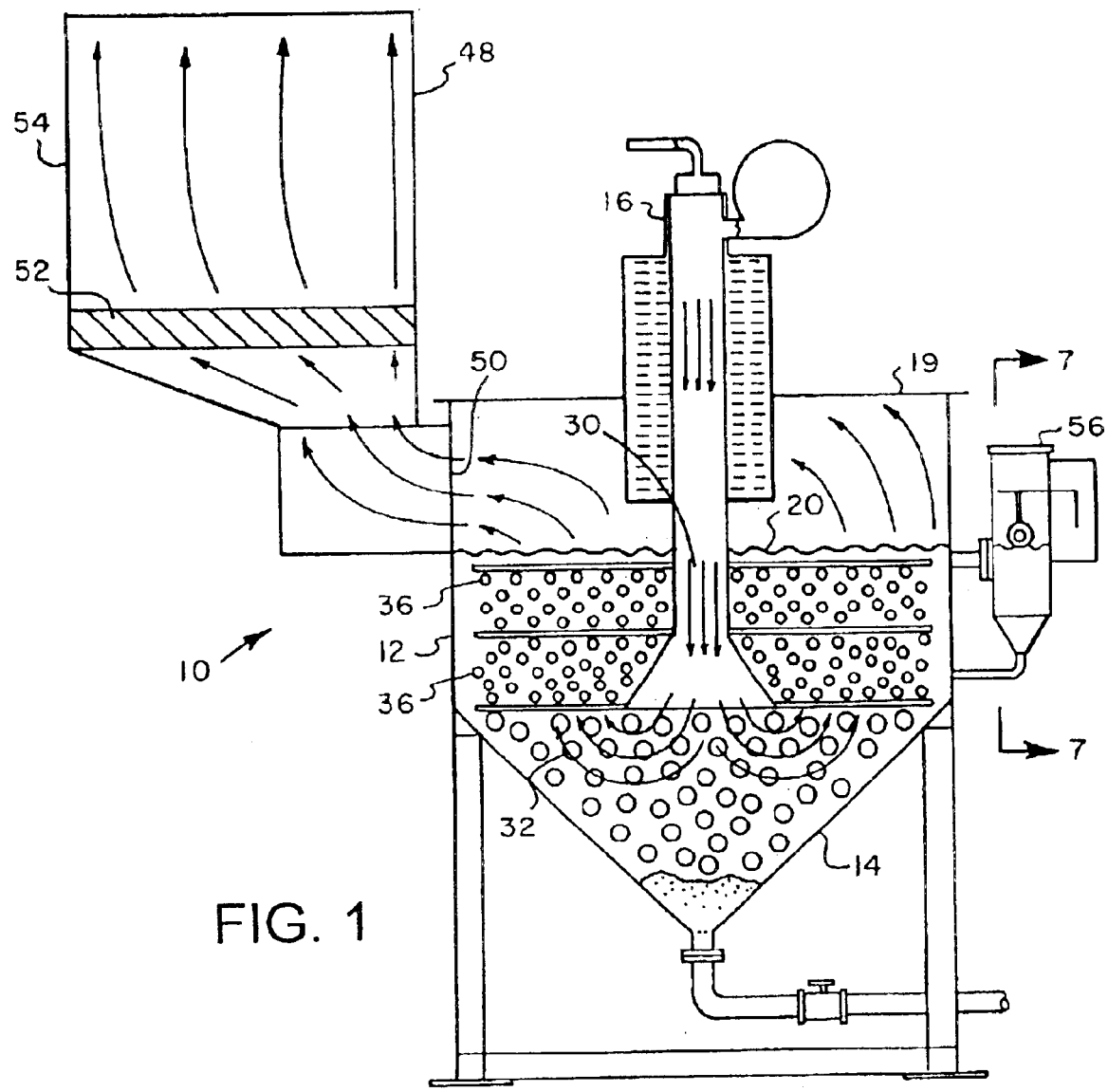
FIG. 1 is a partially broken away schematic side view of the apparatus of the present invention.
Figure 2:
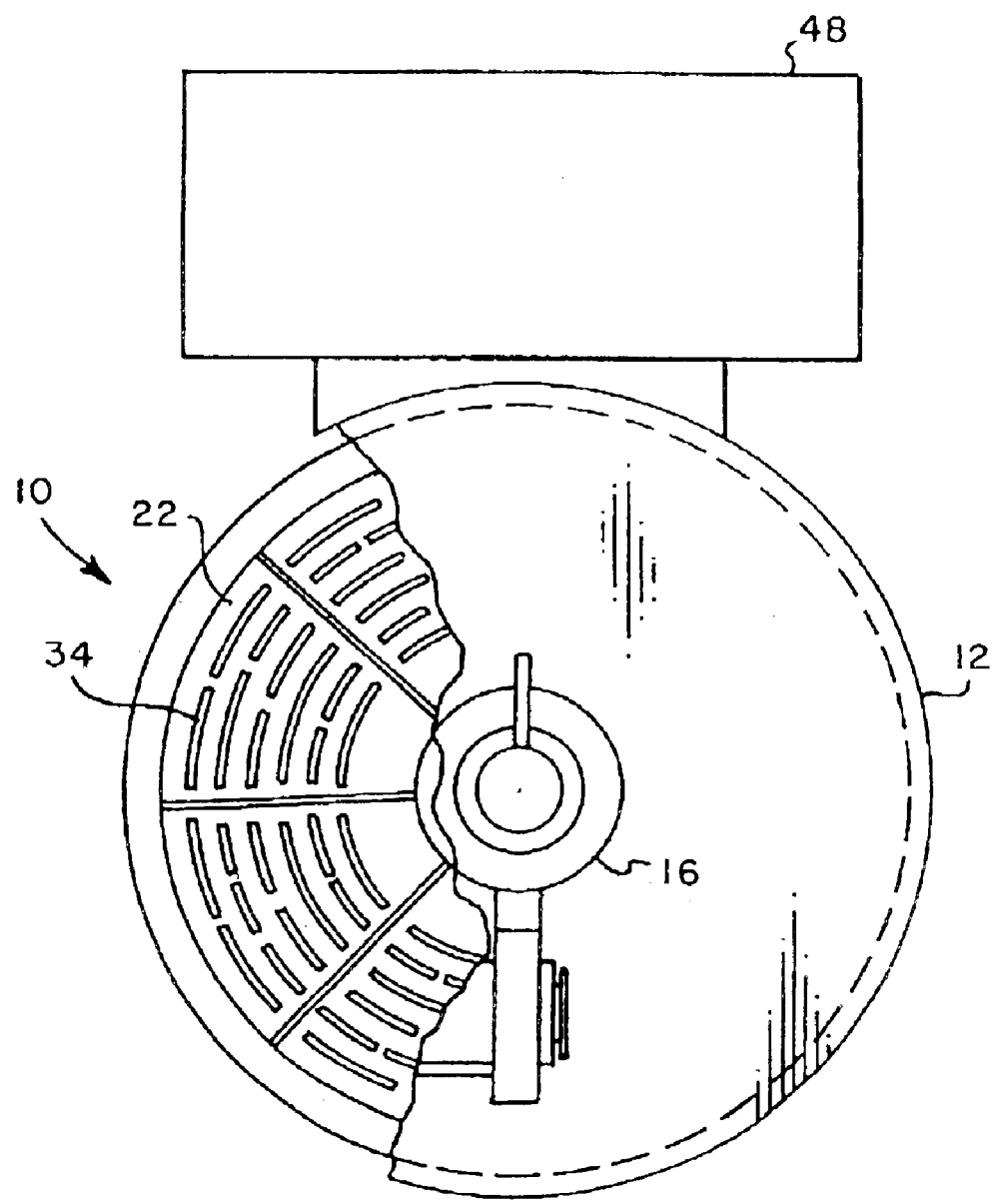
FIG. 2 is a partially broken away schematic top view.

Referring initially to FIGS. 1–6, where like numerals indicate like and corresponding elements, compact evaporation apparatus 10 includes an evaporator vessel 12, which is cylindrical in form with a sloped, bottom chamber 14. While preferably the vessel 12 is cylindrical, a square or rectangular tank may also be used. Depending upon the corrosiveness of the liquid being processed, the vessel 12 may be manufactured from steel (stainless alloys and carbon) or a high temperature fiberglass. The fiberglass vessel 12 is to be used in high corrosion applications. All other submerged components used in a high corrosion application are of a highly corrosion-resistant stainless steel.

A burner 16 is mounted on top of, and fires into, a high temperature castable refractory-lined combustion chamber 18. Combustion chamber 18 extends through a top 19 of the vessel 12. The combustion chamber 18 is sized to achieve total combustion of the air/gas mixture from the burner 16 before being released below the liquid surface 20 in the vessel 12.

The turbulence diverter plates 22, 24, 26 are submerged perforated plates extending horizontally from the combustion chamber 18. As shown in FIG. 1, the hot combustion gasses 30 are released below the bottom diverter plate 26. As the large gas bubbles 32 rise to the surface 20 they have to pass through the small perforations 34 in the three plates 22, 24, 26. By breaking the large, hot gas bubbles 32 into small bubbles 36, the gas to liquid contact area is maximized, which increases the system efficiency.

Figure 3:
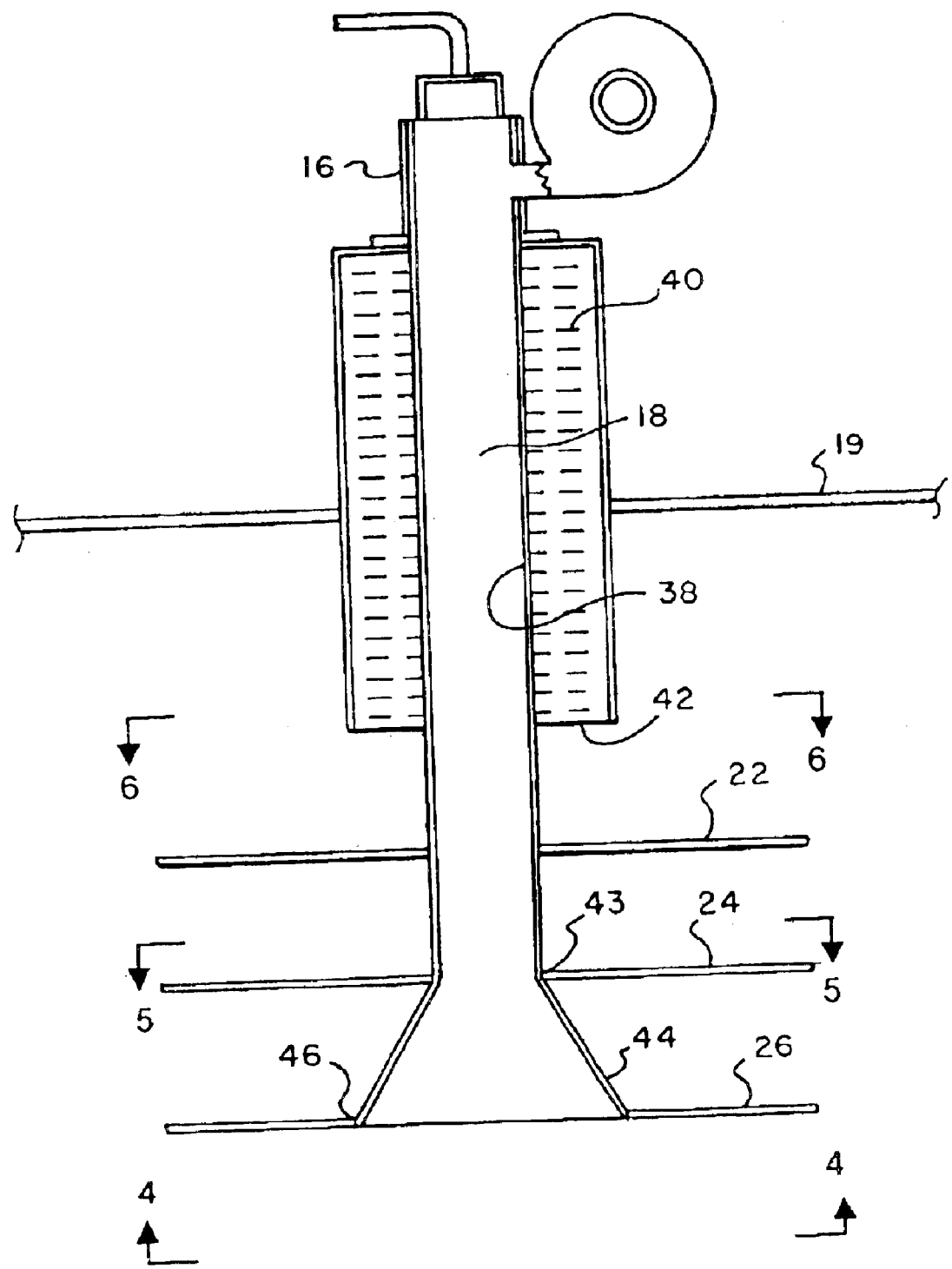
FIG. 3 is a partially broken away schematic side view of the burner/combustion chamber.
Figure 4:
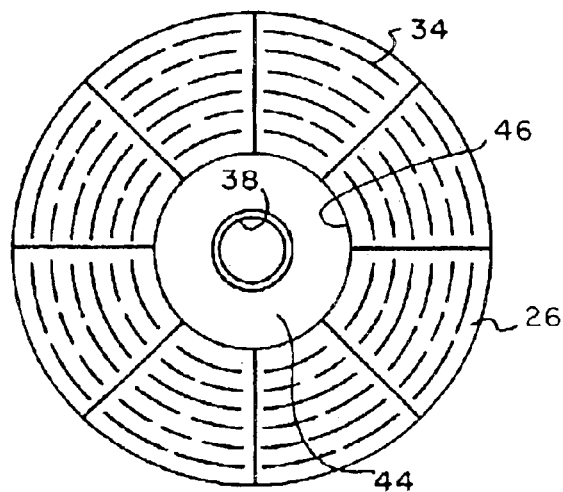
FIG. 4 is a sectional view of the apparatus taken along lines 4—4 in FIG. 3.
Figure 5:
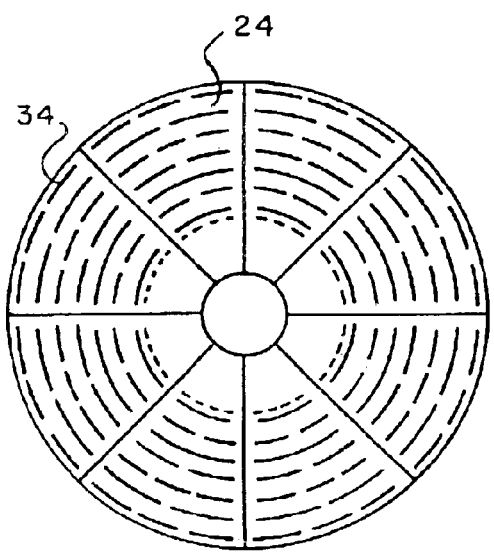
FIG. 5 is a sectional view of the apparatus taken along lines 5—5 in FIG. 3.
Figure 6:
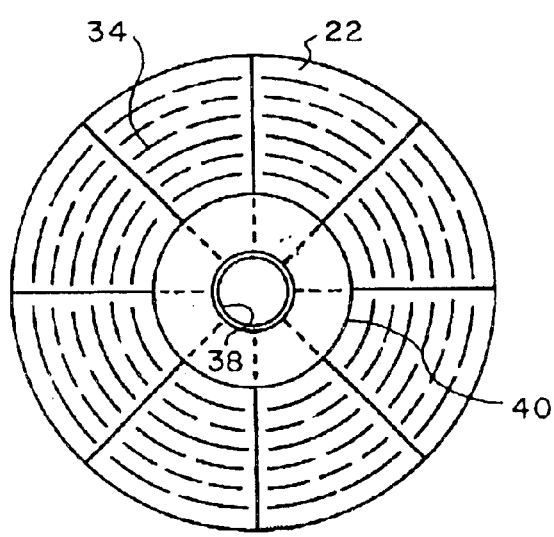
FIG. 6 is a sectional view of the apparatus taken along lines 6—6 in FIG. 3.

In greater detail, as best shown in FIG. 3, combustion chamber 18 includes a downwardly-facing tubular member 38 with refractory lining 40 disposed along an upper portion of its exterior length. Upper diverter plate 22 is disposed horizontally, extending outwardly below the bottom 42 of the refractory lining 40. Tubular member 38 is joined at its lower end 43 to frustro-conical section 44, with combustion chamber 18 being formed of tubular member 38 and frustro-conical section 44. Middle diverter plate 24 is disposed horizontally, extending outwardly from the lower end 43 of the tubular member 38. Frustro-conical section 44 has an open lower end 46, with lower diverter plate 26 disposed horizontally and extending outwardly from the lower end 46 of the frustro-conical section 44. Vapor exhaust chamber 48 is provided to receive water vapors and combustion gasses exhausted through a port 50 above the liquid level 20 on a side of the vessel 12. A mist elimination pad 52 located in the vapor exhaust stack 54 removes any water droplets that may become entrained in the exhaust air stream.

Figure 7:
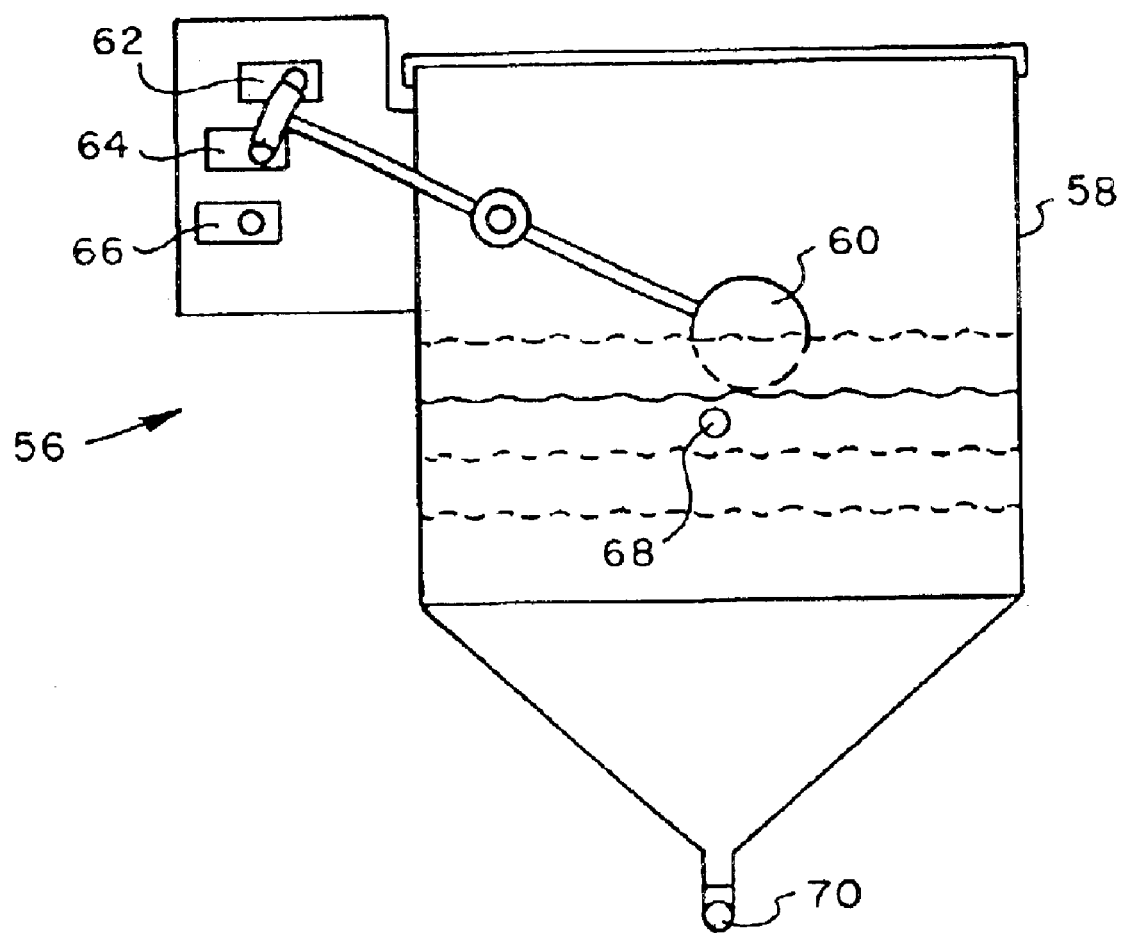
FIG. 7 is a sectional view of the level signal system taken along lines 7—7 of FIG. 1.

Referring now additionally to FIG. 7, a remote level signal system 56 maintains liquid level 20 at about two-thirds of the total depth of the vessel 12. The liquid operating level is maintained between minimum and maximum levels within the vessel 12 by a float system in an external sensing tank 58. This float system includes a pivoted float 60 arranged to actuate electronic limit switches 62,64,66 that turn on a fill pump (not shown) when the minimum level is reached and turn it off when the maximum level is obtained. External sensing tank 58 communicates with vessel 12 through ports 68,70. The external sensing tank 58 is needed to permit a quiescent area where the liquid level may be sensed by a float, there being too much turbulence in vessel 12 to enable direct sensing of the liquid level.

While the invention has been illustrated and described as embodied in a compact evaporation apparatus, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

Whereas, the present invention has been described with respect to a specific embodiment thereof, it will be understood that various changes and modifications will be suggested to one skilled in the art and it is intended to encompass such changes and modifications as fall within the scope of the appended claims.

What is claimed is:

1. Compact evaporation apparatus, comprising:

a cylindrical evaporator vessel with a sloped, bottom chamber;

a combustion chamber mounted to a top of the vessel, with a burner mounted to a top of the combustion chamber;

with the combustion chamber including a downwardly-facing tubular member with refractory lining disposed along an upper portion of its exterior length a plurality of vertically-spaced diverter plates within the vessel beneath the liquid surface, a diverter plates being submerged perforated plates extending horizontally from the combustion chamber, such that hot combustion gasses are released below the diverter plates, and as large gas bubbles rise to the surface they pass through small perforations in the diverter plates, thereby breaking large, hot gas bubbles into small bubbles, the gas to liquid contact area being maximized to increase system efficiency;

with the tubular member joined at its lower end to a frustro-conical section, with the combustion chamber being formed of the tubular member and frustro-conical section with an upper one of the diverter plates disposed horizontally, extending outwardly below a bottom of the refractory lining;

with a middle one of the diverter plates disposed horizontally, extending outwardly from a lower end of the tubular member; and with the frustro-conical section having an open lower end, with a lower one of the diverter plates disposed horizontally and extending outwardly from the lower end of the frustro-conical section.

2. The apparatus of claim 1 with a vapor exhaust chamber provided to receive water vapors and combustion gasses exhausted through a port above the liquid level on a side of the vessel, and a mist elimination pad located in a vapor exhaust stack to remove any water droplets that may become entrained in an exhaust air stream.

3. The apparatus of claim 1 with a remote level signal system to maintain the liquid level at a desired depth in the vessel, the level signal system including an external sensing tank communicating with the vessel through ports, such that the external sensing tank permits a quiescent area where the liquid level may be sensed, isolated from turbulence in the vessel.

4. The apparatus of claim 3 with the liquid operating level being maintained between minimum and maximum levels within the vessel by a float system in the external sensing tank.

5. The apparatus of claim 4 with the float system including a pivoted float arranged to actuate electronic limit switches that turn on a fill pump when the minimum level is reached and turn it off when the maximum level is obtained.

6. Compact evaporation apparatus, comprising:

an evaporator vessel with a sloped, bottom chamber;

a combustion chamber mounted to a top of the vessel, with a burner mounted to a top of the combustion chamber;

turbulence diverter plates within the vessel beneath the liquid surface, a diverter plates being submerged perforated plates extending horizontally from the combustion chamber, such that hot combustion gasses are released below a lower one of the diverter plates, and as large gas bubbles rise to the surface they pass through small perforations in the diverter plates, thereby breaking large, hot gas bubbles into small bubbles, the gas to liquid contact area being maximized to increase system efficiency;

the combustion chamber including a downwardly-facing tubular member with refractory lining disposed along an upper portion of its exterior length;

an upper one of the diverter plates disposed horizontally, extending outwardly below a bottom of the refractory lining;

the tubular member joined at its lower end to a frustro-conical section, with combustion chamber being formed of the tubular member and frustro-conical section;

a middle one of the diverter plates disposed horizontally, extending outwardly from a lower end of the tubular member;

the frustro-conical section having an open lower end, with a lower one of the diverter plates disposed horizontally and extending outwardly from the lower end of the frustro-conical section;

a vapor exhaust chamber provided to receive water vapors and combustion gasses exhausted through a part above the liquid level on a side of the vessel;

a mist elimination pad located in a vapor exhaust stack to remove any water droplets that may become entrained in an exhaust air stream;

a remote level signal system to maintain the liquid level at about two-thirds of the total depth of the vessel;

the liquid operating level being maintained between minimum and maximum levels within the vessel by a float system in an external sensing tank;

the float system including a pivoted float arranged to actuate electronic limit switches that turn on a fill pump when the minimum level is reached and turn it off when the maximum level is obtained;

and the external sensing tank communicating with vessel through ports, such that the external sensing tank permits a quiescent area where the liquid level may be sensed by the float, isolated from turbulence in the vessel.

\* \* \* \* \*